United States Patent [19]

Knablein et al.

[11] 4,291,494
[45] Sep. 29, 1981

[54] INDOOR GREENHOUSE

[76] Inventors: David J. Knablein, 5264 W. 51st St., Fairview, Pa. 16415; Chandler D. Rees, 714 Indiana Dr., Erie, Pa. 16505

[21] Appl. No.: 62,709

[22] Filed: Aug. 1, 1979

[51] Int. Cl.³ .............................................. A01G 9/24
[52] U.S. Cl. ........................................ 47/17; 47/69; 47/84; 47/87; 206/558
[58] Field of Search ............. 47/69, 66, 84, 17, 71–72, 47/79–81, 87; 312/284; 206/558; 220/366–367, 373

[56] References Cited

U.S. PATENT DOCUMENTS

| | | | |
|---|---|---|---|
| 3,241,706 | 3/1966 | Monaco et al. | 47/69 X |
| 3,606,697 | 9/1971 | Eden | 47/17 |
| 3,660,934 | 5/1972 | Pollack et al. | 47/84 |
| 3,751,852 | 8/1973 | Schrepper | 47/87 |
| 3,903,642 | 9/1975 | Yellin | 47/69 |
| 3,961,444 | 6/1976 | Skaife | 47/79 |

FOREIGN PATENT DOCUMENTS 197808 8/1978 Netherlands ........................... 47/69

OTHER PUBLICATIONS

1970 Catalog of Geo. J. Ball, Inc., West Chicago, Ill., p. 81 cited.

Primary Examiner—Robert E. Bagwill

[57] ABSTRACT

A portable greenhouse which includes a base, a cover, and trays. The bottom of the base is corrugated, the bottom of the trays are corrugated. The base, cover and trays all have a peripheral flange. The flanges engage with each other to form a seal around the periphery of the greenhouse. The trays have apertures in the bottom. The cover is transparent with longitudinal and lateral ribs and an air flow vent.

1 Claim, 6 Drawing Figures

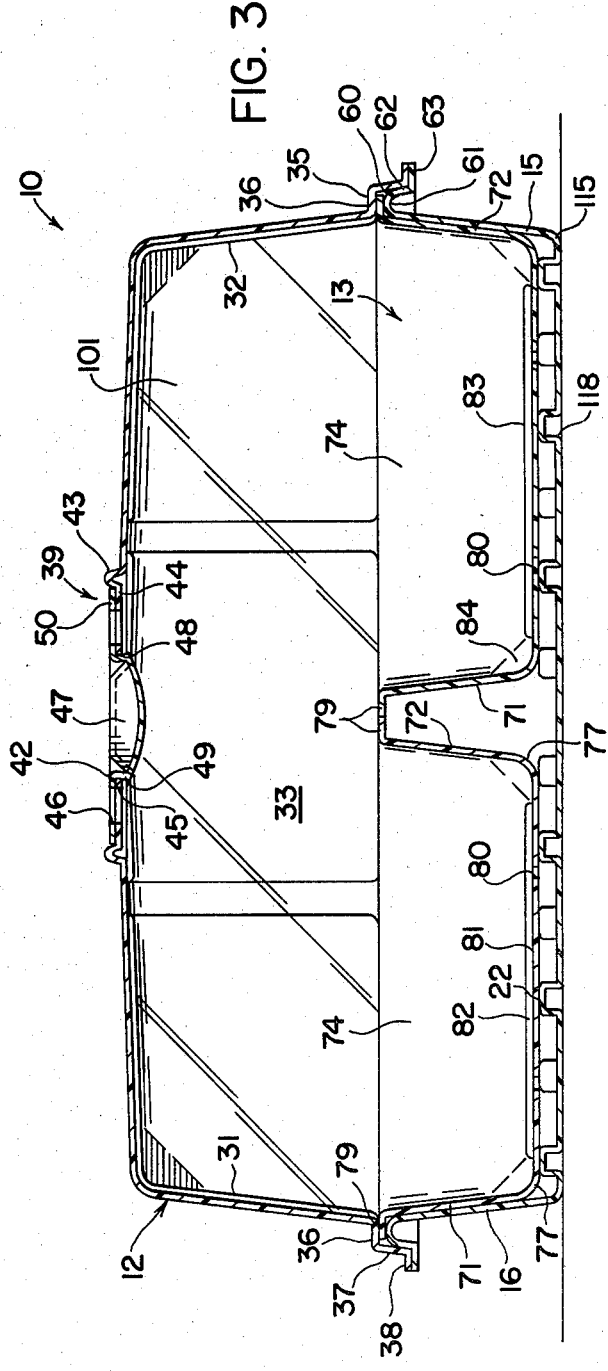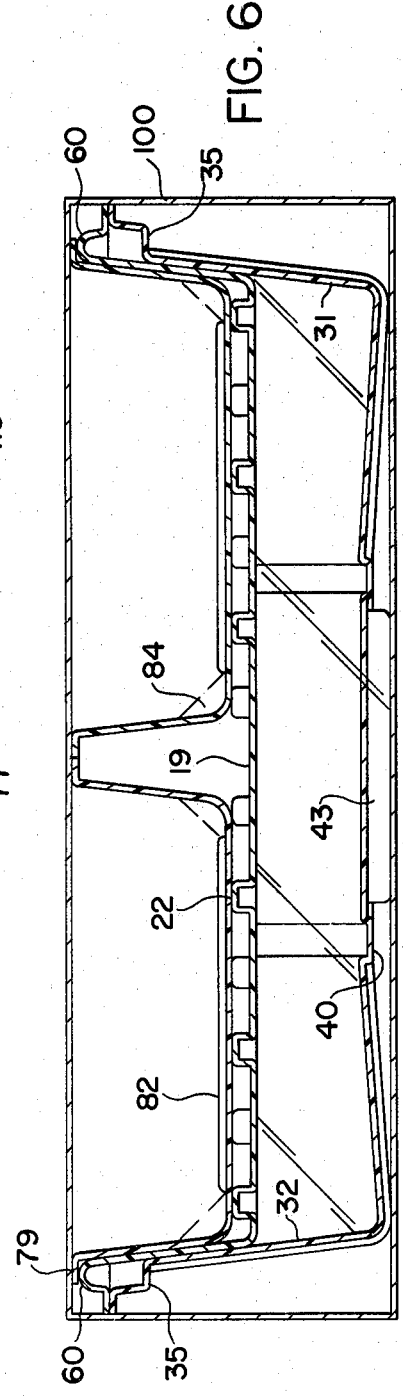

INDOOR GREENHOUSE

BACKGROUND OF THE INVENTION

This invention relates to enclosures for growing plants and more particularly to a portable self-contained greenhouse. Various structures are available presently for the purpose of growing plants in them. These plants often require relatively high moisture content in the atmosphere and the soil as well as relatively warm temperatures. Small portable greenhouses of the prior art include U.S. Pat. Nos. 4,051,626 to Richard L. Trumley; 3,121,975 to Eugene E. Duhamel, 3,106,801 to Gerald H. Risacher, 3,606,697 to Douglas H. Eden. Neither Trumley, Duhamel, Risacher nor Eden provide a vent regulator, flanged trays or a corrugated base for water distribution and tray support as does the present invention.

SUMMARY OF THE INVENTION

The greenhouse of the present invention is easily and economically manufactured. The cover and the base as well as the trays may be manufactured by the vacuum forming process. The greenhouse is light and consequently easy to handle. The cover is provided with a vent so that the user may control the flow of air between the atmosphere of the surrounding area and the greenhouse chamber.

The base is corrugated to provide for water distribution between the apertured flange trays. The trays are supported by the flat upper crests of the base. Also, the tray flanges are supported by the base sides. The cover is beneficially supported by integral ribs which are transparent.

GENERAL DESCRIPTION OF THE DRAWINGS

FIG. 3 is a cross-sectional end view of the greenhouse as it is used taken on Line 3-2 of FIG. 2.

FIG. 6 is a cross-sectional end view of the greenhouse partly removed from its shipping box.

DETAILED DESCRIPTION OF THE DRAWINGS

Figure 1:
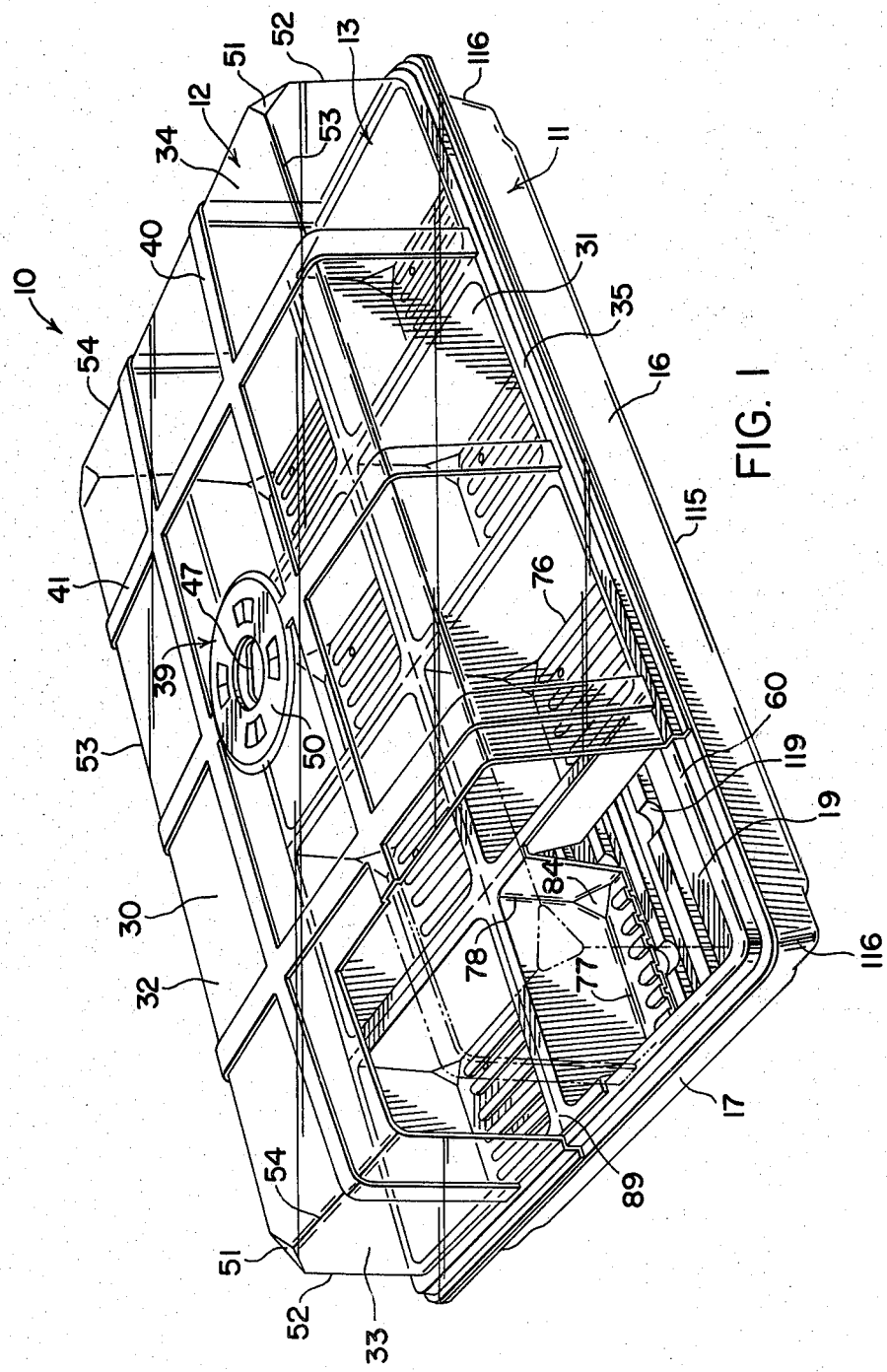
FIG. 1 is an isometric view of the greenhouse.
Figure 4:
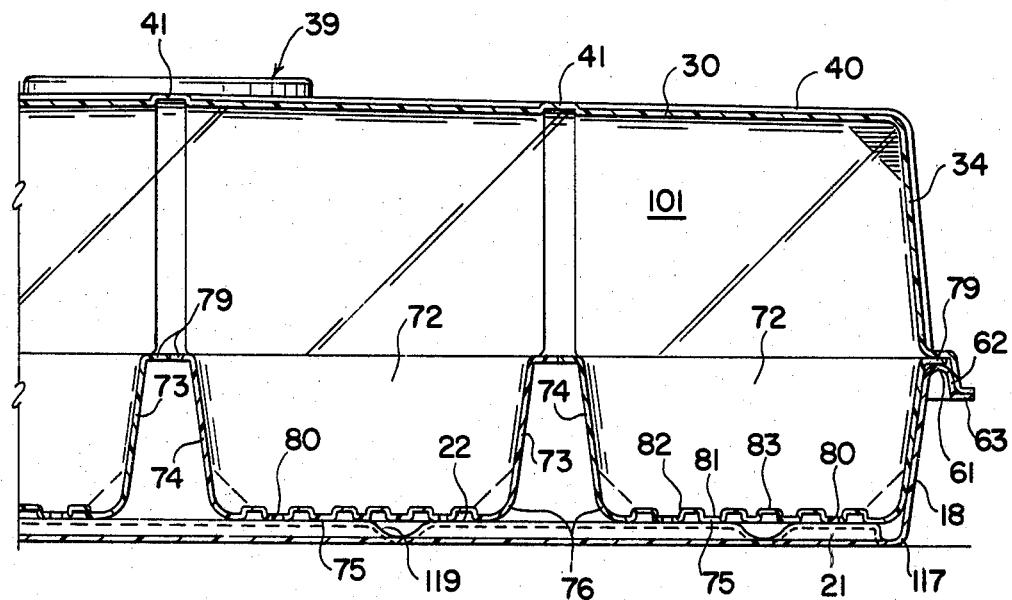
FIG. 4 is a partial cross-sectional side view of the greenhouse taken on Line 4—4 of FIG. 2.

Now, with more particular reference to the drawings, FIGS. 1 through 6 illustrate the improved, portable greenhouse in accordance with the present invention and generally designated 10. The greenhouse 10 encloses chamber 101. The greenhouse 10 includes a base 11 which holds tray 13 for containing soil and upon both of which is supported a transparent cover 12. The base 11 has a base bottom 19, base sides 15,16, base ends 17, 18 and a base flange 60. The base sides are integrally connected to the base bottom and to the base ends. The base sides are integrally connected to the base bottom at a curve on a first base radius 115 as shown in FIG. 3. The base sides and the base ends are integrally connected to each other at a curve on the second base radius 116 as shown in FIG. 1. The base ends are integrally connected to the base bottom at a curve on the third base radius 117 as shown in FIG. 4. The base sides and the base ends extend upwardly and outwardly from the base bottom 19. The base bottom 19 is corrugated.

Figure 2:
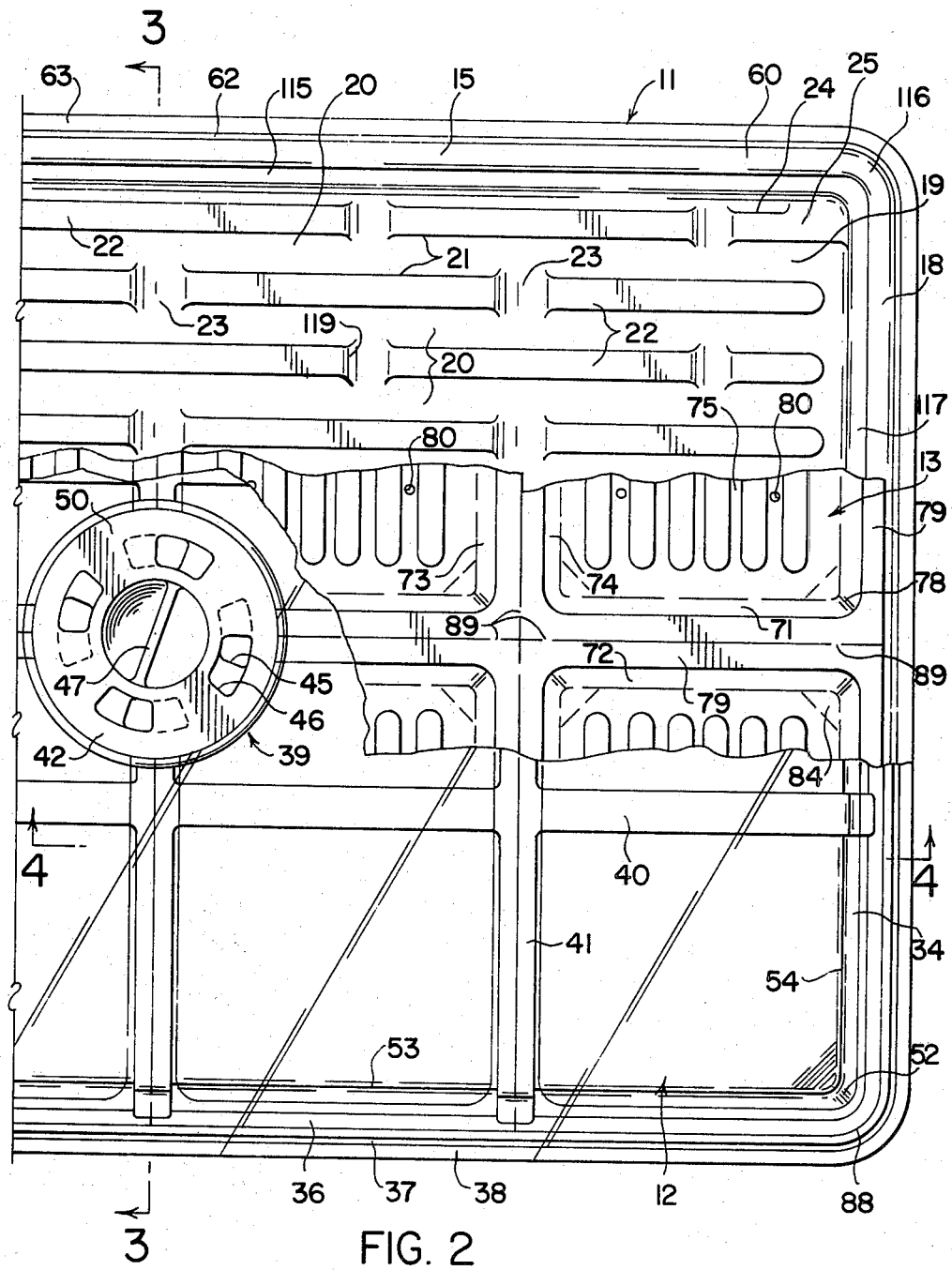
FIG. 2 is a partial top view of the greenhouse.

The base bottom corrugations are made up of transverse valleys 23, longitudinal base valleys 20, longitudinal base crests 21 and corner crests 24 as shown in FIG. 2.

The longitudinal crest 21 have flat upper surfaces 22. Each transverse valley 23 is centered on each crest 21 as shown in FIG. 2. The corner crests 24 have flat L-shaped upper surfaces 25. The flat upper surface 22 of the longitudinal crests and the longitudinal valleys are integrally connected to a fourth radius 118 as shown in FIG. 3. The upper flat surfaces 22 of the longitudinal base crests 21 and the transverse valleys 23 are integrally connected by a fifth radius 119 as shown in FIG. 1. The base flange 60 has upper horizontal base flange member 61, vertical base flange member 62 and lower horizontal base flange member 63 as shown in FIGS. 3 and 4.

The vertical base flange member 62 extends downwardly and outwardly and is integrally connected to the upper and lower horizontal base flange members. The upper horizontal base flange member is integrally connected to the base sides and to the base ends.

The cover 12 is transparent. The cover 12 has the top 30, cover sides 31, 32 and cover ends 33, 34. The longitudinal cover ribs 40 and the lateral cover ribs 41 provide rigidity to the cover. The cover also has vent 39 as shown in FIGS. 1–3.

The cover also has a cover flange 35 which sealingly engages base flange 60 as shown in FIG. 3. The cover sides and the cover ends are integrally connected together at vertical cover corner 52 as shown in FIG. 1. The cover sides and the top are integrally connected together at horizontal cover corners 53 also shown in FIG. 1. The top and cover ends are integrally connected together at lateral cover corners 54 as shown in FIG. 1. The vertical cover corners 52, the horizontal cover corners 53 and the lateral cover corners 54 are integrally connected to the triangular cover corner members 51.

The cover flange 35 has upper horizontal cover flange member 36, vertical cover flange member 37 and lower horizontal cover flange member 38 as shown in FIG. 3. The vertical cover flange member extends downwardly and outwardly and integrally connects to the upper and lower horizontal cover flange members. The upper horizontal cover flange member is integrally connected to the cover sides and to the cover ends.

The longitudinal cover ribs 40 are integrally connected to the cover ends 33 and 34, to the upper horizontal flange member 36 and to the top 30. The lateral cover ribs 41 are integrally connected to cover sides 31 and 32 to the top 30 and to upper horizontal flange member 36.

The vent 39 as shown in FIGS. 1–3 is circular and has outer rib 43, circular planar vent member 44 and planar vent member air flow apertures 45. The vent 39 has vent regulator insert channel 48 and vent regulator 42. The vent regulator is circular and has a planar vent regulator member 50, vent regulator plug 49, vent regulator apertures 46, and vent regulator air flow control tab 47. The vent regulator plug 49 is integrally connected to the planar vent regulator member 50. The vent regulator plug 49 extends downwardly from the planar vent regulator member 50. The vent regulator plug 49 is rotatably inserted into the vent regulator insert channel 48. The flow of air between the greenhouse chamber 101 and the area surrounding the greenhouse is controlled by rotating the vent regulator. The control tab may be held between the operator's thumb and index finger while he rotates the vent regulator. By moving the vent regulator apertures 46 over the planar vent member air flow apertures 45 the size of the common opening changes. When the regulator apertures are aligned directly above the planar vent member apertures the common opening is at a maximum. Thus, the air flow between the greenhouse chamber and the area around the greenhouse would also be at the maximum. When the vent regulator apertures are partially aligned with the planar vent member air flow apertures the amount of air flow is proportionately reduced.

Each tray 13 has tray sides 71, 72, tray ends 73, 74, a tray bottom 75 and a tray flange 79. The tray sides are integrally connected to the tray bottom at a curve on a first tray radius 76 as shown in FIG. 4. The tray ends are integrally connected to the tray bottom at a curve on the second tray radius 77 as shown in FIG. 3. The tray sides and the tray ends are integrally connected to each other at a curve on a third tray radius 78 as shown in FIG. 2. The tray sides and the tray ends extend upwardly and outwardly from the tray bottom. The tray flange is integrally connected to the tray sides and to the tray ends. The tray bottom 75 has tray apertures 80 and is corrugated. The tray bottom 75 has longitudinal valleys 81 and longitudinal crests 82 with flat upper surfaces 83. The first tray radius 76, the second tray radius 77 and the third tray radius 78 are integrally connected to triangular corner member 84 as shown in FIG. 1.

The tray bottom 75 rests on the upper flat surfaces 22 of the longitudinal base crests 21 as shown in FIG. 6. When used seeds or plants are grown in soil in trays 13. Water may be pored over the soil. As the water seeps through the soil it reaches the tray bottom and flows along the tray valleys to tray apertures 80. The water may flow between trays by passing out of the tray apertures of one tray along the base valleys and into another tray through its apertures.

The tray flange 79 extends between and sealingly engages with the upper horizontal cover flange member 36 and with the upper horizontal base flange member 61 as shown in FIG. 3. The lower horizontal cover flange member 38 and the lower horizontal base flange member 63 sealingly engage as shown in FIG. 3. The tray flange is rounded along a horizontal tray flange corner 88 where it sealingly engages the upper horizontal cover flange member 36 at vertical cover corner 52. The trays 13 are flexibly connected together by tray flange connectors 89 as shown in FIG. 1. The tray flange connectors 89 are integrally connected to the tray flanges 79.

Figure 5:
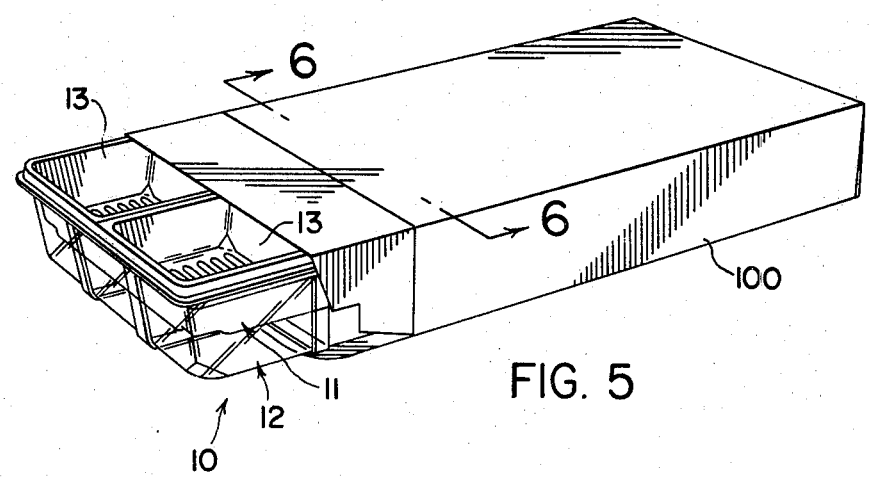
FIG. 5 is an isometric view of the greenhouse partly removed from its storage box.

FIG. 5 shows the greenhouse 10 partly removed from its shipping box 100. FIG. 6 shows a cross-sectional end view of the greenhouse in its shipping box. The base is inverted and nested in the cover so that it will take less space when shipped or stored.

The trays may be used separately. For example, when seedlings have been grown in the greenhouse which are then to be sold by the tray. The trays are joined along the outer edges of the flanges. To separate the trays the tray flange connectors 89 may be easily broken.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A greenhouse in combination having
a base (11),
a cover (12), and
trays (13),
said base (11) comprising,
base sides (15, 16) base ends (17, 18), a base bottom (19) and a base flange (60),
said base sides being integrally connected to said base bottom at a curve on a first base radius (115); said base sides and said base ends being integrally connected to each other at a curve on a second base radius (116),
said base ends being integrally connected to said base bottom at a curve on a third base radius (117),
said base sides and said base ends extending upwardly and outwardly from said base bottom (19),
said base bottom (19) being corrugated comprising,
transverse valleys (23),
longitudinal base valleys (20),
longitudinal base crests (21),
and base corner crests (24) said longitudinal base crests (21) having a flat upper surface (22),
each said transverse valley (23) being centered on each said crest (21),
said corner crest (24) having a flat L-shaped upper surface (25),
said upper flat surface (22) of said longitudinal crests and said longitudinal valleys being integrally connected on a fourth radius (118),
said flat upper surface (22) of said longitudinal crests and said transverse valleys being integrally connected at a fifth radius (119),
said base flange (60) having upper horizontal base flange member (61),
vertical base flange member (62), and
lower horizontal base flange member (63),
said vetical base flange member (62) extending downwardly and outwardly and integrally connected to said upper and lower horizontal base flange members,
said upper horizontal base flange member being integrally connected to said base sides and to said base ends,
said cover (12) being transparent comprising,
a top (30),
cover sides (31, 32),
cover ends (33, 34),
vent (39),
longitudinal cover ribs (40),
lateral cover ribs (41),
and cover flange (35),
said cover sides and said cover ends being integrally connected together at vertical cover corners (52),
said cover sides, and said top being integrally connected together at horizontal cover corners (53),
said top and said cover ends being integrally connected together at lateral cover corners (54),
said vertical cover corner (52),
said horizontal cover corners (53) and said lateral cover corners (54) being integrally connected to triangular cover corner member (51),
said cover flange (35) having upper horizontal cover flange member (36),
vertical cover flange member (37),
lower horizontal cover flange member (38), said vertical cover flange member extending downwardly and outwardly and integrally connected to said upper and lower horizontal cover flange members, said upper horizontal cover flange member being integrally connected to said cover sides and to said cover ends, said longitudinal cover ribs (40) being integrally connected to said cover ends (33, 34), said upper horizontal flange member (36), and to said top (30), said lateral cover ribs (41) being integrally connected to said cover sides (31, 32), to said top (30) and to upper horizontal flange member (36), said vent (39) being circular and having outer vent rib (43), circular planar vent member (44), planar vent member air flow apertures (45), vent regulator insert channel (48), and vent regulator (42), said vent regulator being circular and having planar vent regulator member (50), vent regulator plug (49), vent regulator apertures (46), vent regulator air flow control tab (47), said vent regulator plug (49) being integrally connected to said planar vent regulator member (50), said vent regulator plug (49) extending downwardly from said planar vent regulator member (50), said vent regulator plug (49) being rotatably inserted into said vent regulator insert channel (48), said trays (13) comprising, tray sides (71, 72), tray ends (73, 74), a tray bottom (75) and tray flange (79), said tray sides being integrally connected to said tray bottom at a curve on a first tray radius (76), said tray ends being integrally connected to said tray bottom at a curve on a second tray radius (77), said tray sides and said tray ends being integrally connected at each other at a curve on a third tray radius (78), said tray sides and said tray ends extending upwardly and outwardly from said tray bottom, said tray flange being integrally connected to said tray sides and to said tray ends, said tray bottom (75) having apertures (80) and being corrugated comprising, longitudinal tray valleys (81), longitudinal tray crests (82), said longitudinal crests (82) having a flat upper surface (83), said first tray radius (76), said second tray radius (77) and said third tray radius (78) being integrally connected to triangular tray corner member (84), said tray flange (79) extending between and sealingly engaging said upper horizontal cover flange member (36) and said upper horizontal base flange member (61), said lower horizontal cover flange member (38) and said lower horizontal base flange member (63) being sealingly engaged, said tray flange being rounded along horizontal tray flange corner (88) where said tray flange sealingly engages said upper horizontal base flange member (61) at second base radius (116), and said upper horizontal cover flange member (36) at vertical cover corners (52), said trays (13) being flexibly connected together by tray flange connectors (89), said tray flange connectors (89) being integrally connected to said tray flanges (79).

* * * * *